(12) United States Patent
Yakhnich et al.

(10) Patent No.: US 6,731,700 B1
(45) Date of Patent: May 4, 2004

(54) SOFT DECISION OUTPUT GENERATOR

(75) Inventors: Evgeny Yakhnich, Hadera (IL); Ehud Reshef, Neve Efraim Monosom (IL)

(73) Assignee: Comsys Communication & Signal Processing Ltd., Herzelia (IL)

( * ) Notice: Subject to any disclaimer, the term of this patent is extended or adjusted under 35 U.S.C. 154(b) by 134 days.

(21) Appl. No.: 09/754,566

(22) Filed: Jan. 4, 2001

(51) Int. Cl.$^7$ .............................................. H04L 27/06
(52) U.S. Cl. ..................................................... 375/341
(58) Field of Search ................................ 375/341, 265, 375/340, 316

(56) References Cited

U.S. PATENT DOCUMENTS

| | | | |
|---|---|---|---|
| 5,457,704 A | 10/1995 | Hoeher et al. ................. | 371/43 |
| 5,479,446 A | * 12/1995 | Mourot ......................... | 375/243 |
| 5,838,728 A | * 11/1998 | Alamouti et al. ............. | 375/265 |
| 5,889,823 A | * 3/1999 | Agazzi et al. ............... | 375/341 |
| 5,968,198 A | * 10/1999 | Hassan et al. ............... | 714/752 |

OTHER PUBLICATIONS

Khayrallah, A.S., et al., "Improved Channel Estimation With Side Information", IEEE, pp. 1049–1051, 1997.
Boss, Dieter, et al., "Impact of Blind Versus Non–Blind Channel Estimation on The BER Performance of GSM Receivers", IEEE Signal Processing Workshop on Higher–Order Statistics, pp. 62–66, Jul. 21–23, 1997.
Mehrotra, Asha, GSM System Engineering, Artech House Inc., 1997, pp. 169–245.
Haykin, Simon, Adaptive Filter Theory, Prentice Hall, 1996, pp. 483–535.
Gerstacker, Wolfgang H. et al., "Iterative Equalization With Adaptive Soft Feedback", IEEE, not dated.
Gerstacker, Wolfgang H. et al., "Improved Equalization for GSM Mobile Comunications", IEEE, not dated.
Hafeez, Abdulrauf, et al., "Decision Feedback Sequence Estimation for Unwhitned ISI Channels With Applications to Multiuser Detection"m IEEE Journal on Selected Areas in Communication, vol. 16, No. 9, pp. 1785–1795, Dec. 1998.
Forney Jr., G. David, "The Viterbi Algorithm", pp. 268–178, Nov. 27, 1972.
Berrou, Claude, et al., "A Low Complexity Soft Output Viterbi Decoder Architecture", IEEE, pp. 737–740, Dec., 1993.
Thielecke, John A. "A Soft–Decision State–Space Equalizer for FIR Channels", IEEE Transactions on Communications, vol. 45, No. 10, pp. 1208–1217. Oct. 10, 1997.

(List continued on next page.)

*Primary Examiner*—Khai Tran
*Assistant Examiner*—Kevin M Burd
(74) *Attorney, Agent, or Firm*—Howard Zaretsky; Zaretsky & Associates PC

(57) ABSTRACT

An apparatus for and method of generating soft decision information from a sequence of hard symbol decisions output from a decoder in a concatenated communications receiver. Soft symbol decisions are computed given hard symbol decisions from the equalizer, channel estimation information (i.e. FIR filter taps used to estimate the channel), and the input samples received from the channel. The log likelihood ratio (LLR) for all symbol possibilities is calculated by computing the conditional probability of the input sample sequence given the hard symbol decision sequence. The noise variance is optionally used in computing the soft output values, thus improving the overall performance of the receiver. In one embodiment, symbol vectors are calculated beforehand and stored in a table. An error vector calculator functions to calculate an error vector that is applied to soft output calculation units. Each soft output calculation unit functions to generate a soft output value for a particular symbol candidate.

91 Claims, 7 Drawing Sheets

OTHER PUBLICATIONS

Hansson, Ulf et al., "Soft Information Transfer for Sequence Detection With Concatenated Receivers", IEEE Transactions on Communications, vol. 44, No. 9, pp. 1086–1095, Sep. 1996.

Seshadri, N. et al., "On Post–Decision Symbol–Reliability Generation", IEEE, pp. 741–745, Feb. 1993.

Nagayasu, Takayuki, et al., "A Soft–Output Viterbi Equalizer Employing Expanded Memory Length in a Trellis", IEICE Trans. Commun. vol. E80–B, No. 2, pp. 381–385, Feb. 1997.

Park, Jong II, et al., "Trellis–Based Soft–Output Adaptive Equalization Techniques for TDMA Cellular Systems", IEEE Transactions on Vehicular Technology, vol. 49, No. 1, pp. 83–94, Jan. 2000.

Fossorier, Marc P.C., et al., "On The Equivalence Between SOVA and Max–Log–MAP Decodings", IEEE Communications Letters, vol. 2, No. 5, pp. 137–139, May 1998.

Cong, Ling, et al., "On SOVA for Nonbinary Codes", IEEE Communications Letters, vol. 3, No. 12, pp. 335–337, Dec. 1999.

Hagenauer, Joachim, et al., "A Viterbi Algorithm with Soft–Decision Outputs and its Applications", IEEE, pp. 1680–1686, 1989.

Li, Yunixin, et al., "Optimum Soft–Output Detection for Channels with Intersymbol Interference", IEEE Transactions on Information Theory, vol. 41, No. 3, pp. 704–713, May 1995.

Proakis, John G. Digital Communications, McGraw–Hill, 1989, pp. 602–643.

Han, Youngyearl, "On The Minimization of Overhead in Channel Impulse Response Measurement", IEEE Transactions on Vehicular Technology, vol. 47, No. 2, pp. 631–636, May 1998.

* cited by examiner

SOFT DECISION OUTPUT GENERATOR

REFERENCE TO RELATED APPLICATION

The subject matter of the present application is related to and may be advantageously combined with the subject matter of copending and commonly owned application U.S. patent application Ser. No. 09/616,161, to Yakhnich et al, filed Jul. 14, 2000, entitled "Method of Channel Order Selection and Channel Order Estimation in a Wireless Communication System," incorporated herein by reference in its entirety.

FIELD OF THE INVENTION

The present invention relates generally to communication systems and more particularly relates to an apparatus for and a method of generating soft decision information for symbols received over a channel.

BACKGROUND OF THE INVENTION

In recent years, the world has witnessed explosive growth in the demand for wireless communications and it is predicted that this demand will increase in the future. There are already over 500 million users that subscribe to cellular telephone services and the number is continually increasing. Eventually, in the not too distant future the number of cellular subscribers will exceed the number of fixed line telephone installations. Already, in many cases, the revenues from mobile services already exceeds that for fixed line services even though the amount of traffic generated through mobile phones is much less than in fixed networks.

Other related wireless technologies have experienced growth similar to that of cellular. For example, cordless telephony, two way radio trunking systems, paging (one way and two way), messaging, wireless local area networks (WLANs) and wireless local loops (WLLs). In addition, new broadband communication schemes are rapidly being deployed to provide users with increased bandwidth and faster access to the Internet. Broadband services such as xDSL, short range high speed wireless connections, high rate satellite downlink (and the uplink in some cases) are being offered to users in more and more locations.

In connection with cellular services, the majority of users currently subscribe to digital cellular networks. Almost all new cellular handsets sold to customers are based on digital technology, typically second generation digital technology. Currently, third generation digital networks are being designed and tested which will be able to support data packet networks and much higher data rates. The first generation analog systems comprise the well known protocols AMPS, TACS, etc. The digital systems comprise GSM, TDMA (IS-136) or CDMA (IS-95), for example.

A diagram illustrating an example prior art communication system employing an inner and outer encoder in the transmitter, inner and outer decoding stages in the receiver and a noise source after the channel is shown in FIG. 1. The communication system, generally referenced 10, represents the typical scheme that may be used in providing many of the communication services described above. In such a system, the transmitter 11 comprises an encoder 14, symbol generator 16 and modulator 18. Input data bits 12 to be transmitted are input to the encoder 14, which may comprise an error correction encoder such as a Reed Solomon encoder, a convolutional encoder, a parity bit generator, etc. The encoder functions to add redundancy bits to enable errors in transmission to be located and corrected.

It is noted that both the inner and outer decoders in the receiver have complementary encoders in the transmitter. The outer encoder in the transmitter comprises the encoder 14, e.g., Reed Solomon, etc. The inner encoder comprises the channel 20 which often times can be modeled as an L-symbol long FIR-type channel.

The bits output of the encoder are then mapped to symbols by the symbol generator 16. The symbol generator functions to transform the bits to modulator symbols. For example, an 8-PSK modulator converts input bits into one of eight symbols. Thus, the symbol generator generates a symbol for every three input bits.

The output from the mapper is input to the modulator which receives symbols in the M-ary alphabet and generates the analog signal subsequently transmitted over the channel 20. The channel may comprise a mobile wireless channel, e.g., cellular, cordless, a fixed wireless channel, e.g., satellite, or may comprise a wired channel, e.g., xDSL, ISDN, Ethernet, etc. The processing performed in the transmitter is intended to generate a signal that can be transmitted over the channel to provide robust, error free detection by the receiver.

At the receiver 13, the analog signal from the channel is input to front end circuitry 22 which demodulates and samples the received signal to generate received samples y(k) 21. The samples are first input to an inner decoder 24. An example of an inner decoder is an equalizer which compensates for the ISI caused by the delay and time spreading of the channel. Examples of commonly used types of equalizers include the maximum likelihood sequence estimation (MLSE) equalizer that utilizes the well known Viterbi Algorithm (VA), linear equalizer and decision feedback equalizer (DFE). The function of the equalizer is to detect the symbols that were originally transmitted by the modulator.

The output of the inner decoder comprises symbols s(k) 23 which represent hard decisions. The hard decisions are then input to an outer decoder 26 which functions to locate and fix errors using the redundancy inserted by the encoder. The outer decoder generates the binary receive data.

An example of an outer decoder is a convolutional decoder that utilizes the Viterbi Algorithm. The Viterbi algorithm is widely used in communication systems and has been adapted to perform functions including demodulation, decoding, equalization, etc. Many systems utilize the Viterbi Algorithm in both the inner and outer decoding stages.

As described above, the outer decoder, in some systems, is adapted to utilize the hard decisions output from the inner decoder, e.g., the equalizer. Optimal decoders, on the other hand, require soft decision inputs. For example, an outer decoder that utilizes the Viterbi Algorithm to perform convolutional forward error correction decoding, requires soft decisions as input. The advantage of a Viterbi decoder is that it can efficiently process soft decision information.

One drawback of such a system is that in some cases the outer decoder is very sensitive to error bursts produced by the inner decoder. A second drawback arises when the inner decoder cannot provide soft decision information and thus only provides hard decisions to the outer decoder. In such a system, the performance of the outer stages of a concatenated coding system is substantially lower than that of a system wherein the inner decoder is capable of generating soft decision information.

The problem is illustrated by considering a receiver adapted to handle a GSM or GERAN signal. Such a system utilizes convolutional coding for performing Forward Error Correction (FEC) over channels that require equalization. The equalizer and outer FEC decoder typically used employ the Viterbi Algorithm in their operation. The output of the equalizer, however, only produces hard decisions which leads to reduced performance of the outer VA convolutional FEC decoder.

There exist a class of decoders that provide improved performance by utilizing soft information about the received symbols rather than only hard decisions. Examples include turbo decoders and soft decision convolutional decoders utilizing the Viterbi Algorithm, etc. This class of decoders provides better performance by taking into account soft information about the reliability of received symbols. The improved performance of the decoder cannot be realized, however, when soft information about the received symbols is not available.

The problem of error bursts can be eliminated by the use of interleaving in the transmitter and de-interleaving in the receiver, between the inner and the output decoders. The second problem can only be eliminated by providing an inner decoder capable of generating soft decision information.

Several prior techniques have been developed to provide soft symbol decisions from the inner decoder (or equalizer) that can be used by a soft decoder. Most of these soft output equalizer techniques are based on maximum likelihood sequence estimation (MLSE) or computational complex methods such as maximum a posteriori (MAP) algorithms. A few of these techniques are described below.

One technique uses an optimum soft output algorithm derived under the constraint of fixed decision delay for detection of M-ary signals in the presence of ISI and additive white Gaussian noise, as described in "Optimum Soft-Output Detection for Channels with Intersymnbol Interference," Y. Li, B. Vucetic, Y. Sato, IEEE Trans. on Inform. Theory, Vol. 41, No. 3, May 1995. This technique is a type of symbol by symbol maximum a posteriori (MAP) probability algorithm which functions to reduce the memory and computation requirements of the MAP algorithm. MAP algorithm techniques typically suffer from high computational complexity. With this algorithm, however, the memory requirement increases linearly with the sequence length which makes it unsuitable for long sequences. A suboptimum soft-output algorithm (SSA) is described which is an extension of the Viterbi Algorithm with the additional requirements of storing a soft survivor for each state and updating it recursively. This suboptimal algorithm sacrifices a modest amount of performance in return for reduced complexity. Its complexity, however is still higher than that of the VA.

Another extension of the Viterbi Algorithm is described in "A Viterbi Algorithm with Soft-Decision Outputs and its Applications," J. Hagenauer and P. Hoeher, Proc. GLOBCOM '89 (Dallas, Tex.), Nov. 1989, Vol. 3, pages 47.1.1–47.1.7. In addition to the most likely path sequence, the algorithm provides either a posteriori probability of each symbol or a reliability value. From this, the soft decisions are generated to be used in decoding of outer codes. The inner soft output Viterbi Algorithm (SOVA) accepts and delivers soft sample values. A disadvantage of this algorithm is that it operates on bits rather than symbols.

A SOVA algorithm for non-binary codes that is equivalent to the Max-Log MAP algorithm has been developed and described in "On SOVA for Nonbinary Codes," L. Cong, W. Xiaofu and Y. Xiaoxin, IEEE Comm. Letters, Vol. 3, No. 12, December 1999. Viterbi-type recursions are used to update the reliability measures associated with the SOVA. This algorithm, however, is complex and requires significant computing resources to implement.

The results of a study of the design and performance of soft output adaptive equalization techniques based on suboptimum trellis based soft output decoding algorithm is given in "Trellis-Based Soft-Output Adaptive Equalization Techniques for TDMA Cellular Systems," J. I. Park, S. B. Wicker and H. L. Owen, IEEE Trans. Vehicular Technology, Vol. 49, No. 1, January 2000. The study compares the performance of the soft output Viterbi algorithm (SOVA, suboptimum soft-output algorithm (SSA) and the modified maximum a posteriori (MAP) algorithm within the context of a TDMA cellular system using Gaussian minimum shift keying (GMSK) modulation. Soft output information is generated from the inner equalizer and used in a soft decision decoder. The trellis based soft output decoding algorithms including SOVA, SSA and modified MAP can be used to estimate reliability information.

In addition, U.S. Pat. No. 5,457,704, issued to Hoeher et al., describes a method for providing reliability information for each decoded data symbol at the output of an arbitrary decoder. The reliability information is generated by comparing the decoded sequence to a small list of alternative sequences which differ at least in the symbol for which the reliability is being sought.

Several disadvantages of one or more of the above described prior art techniques are that they (1) have a high level of computational complexity and are difficult and impractical to implement in communication systems having a large symbol alphabet, (2) have a high level of computational complexity and are impractical to implement in communication systems wherein the channel has a time spread of several symbol periods, (3) do not generate soft output information on a symbol basis, (4) do not provide soft output information for all symbol possibilities for use by an outer decoding stage (i.e. they do not provide a complete information packet), or (5) are restricted to Viterbi decoding in the inner decoding state.

SUMMARY OF THE INVENTION

Accordingly, the present invention provides a novel and useful apparatus for and method of generating soft decision information from a sequence of hard symbol decisions output from a decoder in a communications receiver that overcomes the disadvantages of the prior art. The present invention is suitable for use with a wide range of communication systems and is particularly useful in receivers that comprise concatenated coding schemes whereby the output of an inner decoder is subsequently processed by an outer decoder. The outer decoder is a soft decision decoder whose performance is optimized when soft decision values are available.

Thus, the present invention has applications when the inner decoder used in the communications receiver is only able to generate hard decisions and does not have the capability of generating soft output values. The soft output generator of the present invention is adapted to generate soft decision information from the hard symbol decisions output of the inner decoder. The soft decision output can then be applied to the soft outer decoder thus realizing maximum performance therefrom. The output of the soft decision generator comprises a full information packet, i.e. a soft decision value for each symbol possibility. Alternatively, the soft decision generator may be adapted to output soft values for less than the full number of symbol possibilities.

In addition, the invention is applicable to concatenated communication receivers in which use of a reduced complexity soft output equalizer is dictated by system requirements. This may be the case in (1) communication systems having relatively large size symbol alphabets or in (2) systems where the channel is characterized by a time spread of several symbol periods which is the case in most mobile radio channels.

The present invention provides an apparatus for and method of computing soft symbol decisions given (1) hard symbol decisions from the equalizer, (2) channel model information (e.g., FIR filter taps used to estimate the channel), and (3) the input samples received from the channel. The log likelihood ratio (LLR) for a symbol is derived by determining the conditional probability of the input sample sequence given the hard symbol decision sequence.

A key feature of the invention is that the noise variance is used in computing the soft output values, thus resulting in better overall performance of the receiver. In many real world systems, the noise statistic varies with time and cannot be assumed constant. In accordance with another key feature of the invention, soft output values are generated for all symbol possibilities. Thus, considering 8-PSK modulation, the invention is operative to generate eight soft output values for each symbol.

Another feature of the invention is that it is operative to generate a complete information packet or a portion thereof which can subsequently be used by the outer decoder. It is noted that the invention achieves this using a relatively low complexity technique described infra.

The invention can be implemented in either hardware or software. In one embodiment, symbol vectors are calculated beforehand and stored in a table. An error vector calculator functions to calculate an error vector that is applied to soft output calculation units. Each soft output calculation unit functions to generate a soft output value for a particular symbol possibility.

In another embodiment, a computer comprising a processor, memory, etc. is operative to execute software adapted to perform the soft output generator method of the present invention.

The present invention provides the following advantages and benefits. The generation of soft decision information is independent of the type of equalizer used in the receiver. This permits soft value information to be generated in a receiver that incorporates a Low Complexity Equalizer as well as in one that incorporates a Full Complexity Maximum Likelihood Equalizer. The soft output generator method is computationally efficient in that a minimum number of arithmetic operations are required for its implementation.

Another benefit is that the soft output generator method does not require any additional memory, unlike many prior art soft output techniques. In addition, the method performs relatively well for good to moderate Symbol Error Rate (SER) values of the inner decoder.

There is thus provided in accordance with the present invention, a method of generating soft decision information for an M-ary symbol in a communication receiver coupled to a channel wherein the communication receiver includes a first decoder adapted to generate a sequence of hard symbol decisions from a received signal, the method comprising the steps of providing the sequence of hard symbol decisions from the first decoder, providing a plurality of input samples generated in accordance with the received signal, providing an estimate of the channel, generating a soft decision value for one or more possible values of the M-ary symbol for each given symbol wherein each soft decision value is calculated as a function of the sequence of hard symbol decisions, the plurality of input samples and the channel estimate.

There is also provided in accordance with the present invention, a communications receiver for receiving and decoding an M-ary transmitted signal, comprising a radio frequency (RF) front end circuit for receiving and converting the M-ary transmitted signal to a baseband signal, a demodulator adapted to receive the baseband signal and to generate a received signal therefrom in accordance with the M-ary modulation scheme used to generate the transmitted signal, a first decoder operative to receive the received signal and to generate a sequence of hard symbol decisions therefrom, a soft output generator comprising processing means programmed to receive the sequence of hard symbol decisions from the first decoder, receive a plurality of input samples generated based on the received signal, receive an estimate of the channel, generate a soft decision value for one or more possible values of the M-ary symbol for each given symbol wherein each soft decision value is calculated as a function of the sequence of hard symbol decisions, the plurality of input samples and the channel estimate, and a second decoder adapted to receive the soft output values and to generate binary received data therefrom.

There is further provided in accordance with the present invention, an apparatus for generating soft decision information for an M-ary symbol in a communication receiver coupled to a channel wherein the communication receiver includes a first decoder adapted to generate a sequence of hard symbol decisions from input samples generated from a received signal, comprising error calculator means operative to generate an error vector at each symbol time as a function of the input samples, an estimate of the channel and the sequence of hard symbol decisions, a symbol vector table comprising a plurality of symbol vectors generated for all possible symbol values, and soft output calculation means adapted to generate a soft output value for each symbol possibility as a function of the error vector and the plurality of symbol vectors.

There is also provided in accordance with the present invention, a method of generating soft decision information for an M-ary symbol from a sequence of hard symbol decisions generated by a decoder, wherein the decoder adapted to receive input samples from a channel coupled thereto, the method comprising the steps of providing a plurality of input samples generated in accordance with a received signal, providing an estimate of the channel, generating an error vector at each symbol time as a function of the input samples, the channel estimate and the sequence of hard symbol decisions, providing a symbol vector table comprising a plurality of symbol vectors generated for all possible symbol values, and generating a soft output value for each symbol possibility as a function of the error vector and the plurality of symbol vectors.

There is still further provided in accordance with the present invention, a method of generating soft decision information for an M-ary symbol, the method comprising the steps of providing a sequence of error vectors $e_k$ generated by an inner decoder as a function of a plurality of input samples generated in accordance with a signal received from a channel coupled thereto, an estimate of the channel, and a sequence of hard symbol decisions also generated by the inner decoder, providing a symbol vector table comprising a plurality of symbol vectors generated for all possible symbol values, and generating a soft output value for each symbol possibility as a function of the error vector and the plurality of symbol vectors.

In addition, there is provided in accordance with the present invention, a computer readable storage medium having a computer program embodied thereon for causing a suitably programmed system to generate soft output values by performing the following steps when such program is executed on the system: receiving the sequence of hard symbol decisions from the first decoder, receiving a plurality of input samples generated based on the received signal, receiving an estimate of the channel, generating a soft decision value for all possible values of the M-ary symbol for each given symbol wherein each soft decision value is calculated as a function of the sequence of hard symbol decisions, the plurality of input samples, the channel estimate and the noise variance value.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout
The following notation is used throughout this document.

| Term | Definition |
| --- | --- |
| AMPS | Advanced Mobile Telephone System |
| ASIC | Application Specific Integrated Circuit |
| AWGN | Additive White Gaussian Noise |
| BER | Bit Error Rate |
| CDMA | Code Division Multiple Access |
| CPU | Central Processing Unit |
| DFE | Decision Feedback Equalizer |
| DSL | Digital Subscriber Line |
| DSP | Digital Signal Processor |
| EDGE | Enhanced Data rates for GSM and TDMA/135 Evolution |
| EEPROM | Electrically Erasable Programmable Read Only Memory |
| EGPRS | Enhanced General Packet Radio System |
| FEC | Forward Error Correction |
| FIR | Finite Impulse Response |
| FPGA | Field Programmable Gate Array |
| GERAN | GSM EDGE Radio Access Network |
| GMSK | Gaussian Minimum Shift Keying |
| GSM | Global System for Mobile Communication |
| ISDN | Integrated Services Digital Network |
| ISI | Intersymbol Interference |
| LLR | Log Likelihood Ratio |
| MAP | Maximum A Posteriori |
| MCS | Modulation Coding Scheme |
| MLSE | Maximum Likelihood Sequence Estimation |
| PSK | Phase Shift Keying |
| RAM | Random Access Memory |
| ROM | Read Only Memory |
| SER | Symbol Error Rate |
| SNR | Signal to Noise Ratio |
| SO | Soft Output |
| SOVA | Soft Output Viterbi Algorithm |
| SSA | Suboptimum Soft-output Algorithm |
| TACS | Total Access Communications Systems |
| TDMA | Time Division Multiple Access |
| VA | Viterbi Algorithm |
| WLAN | Wireless Local Area Network |
| WLL | Wireless Local Loop |

Detailed Description of the Invention

The present invention is an apparatus for and method of generating soft decision information from a sequence of hard symbol decisions output from a decoder. The decoder may comprise the inner decoder in a concatenated communications receiver. The present invention is suitable for use with a wide range of communication systems and is particularly useful in receivers that comprise concatenated coding schemes whereby the inner decoder must provide soft decision information to a soft decision outer decoder. The performance of the outer decoder is optimized when soft decision values are available.

Figure 1:
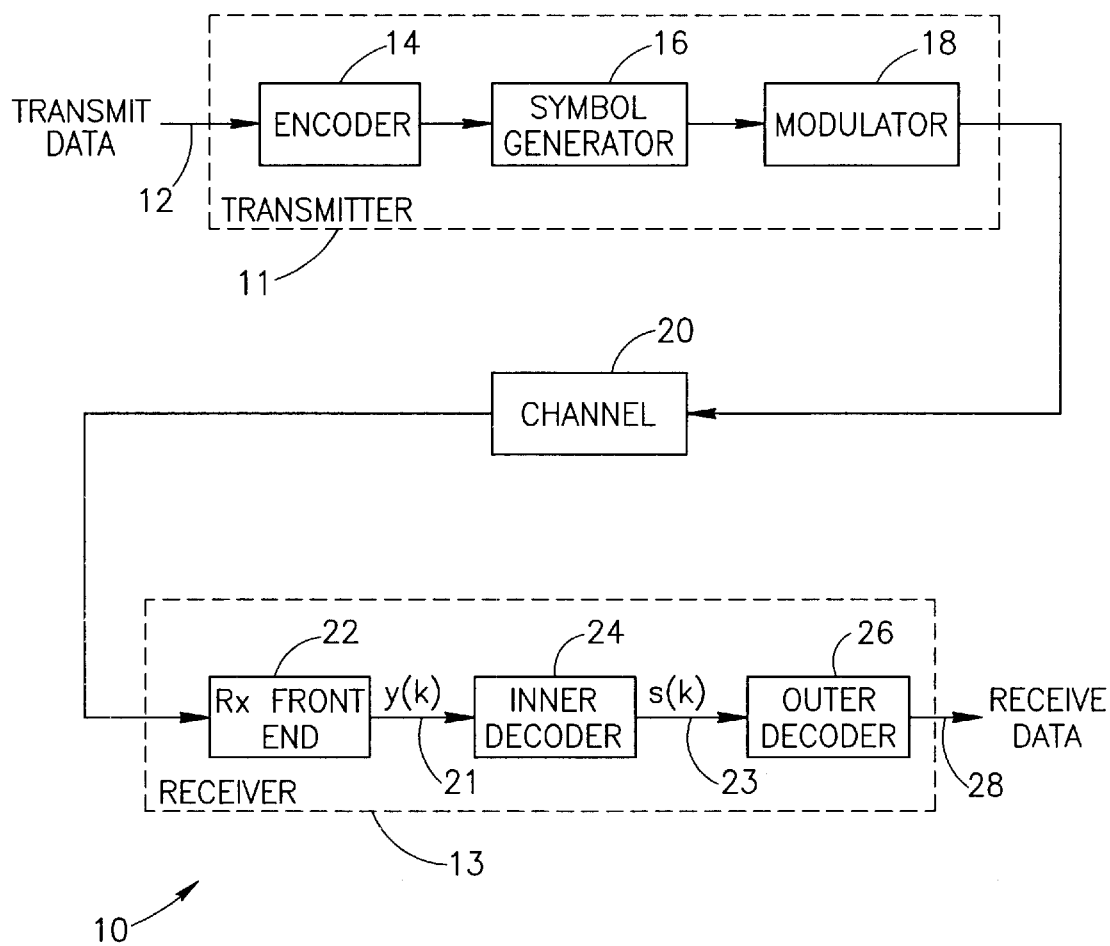
FIG. 1 is a diagram illustrating an example prior art communication system employing an inner and outer encoder in the transmitter, inner and outer decoding stages in the receiver and a noise source added to the channel.
Figure 2:
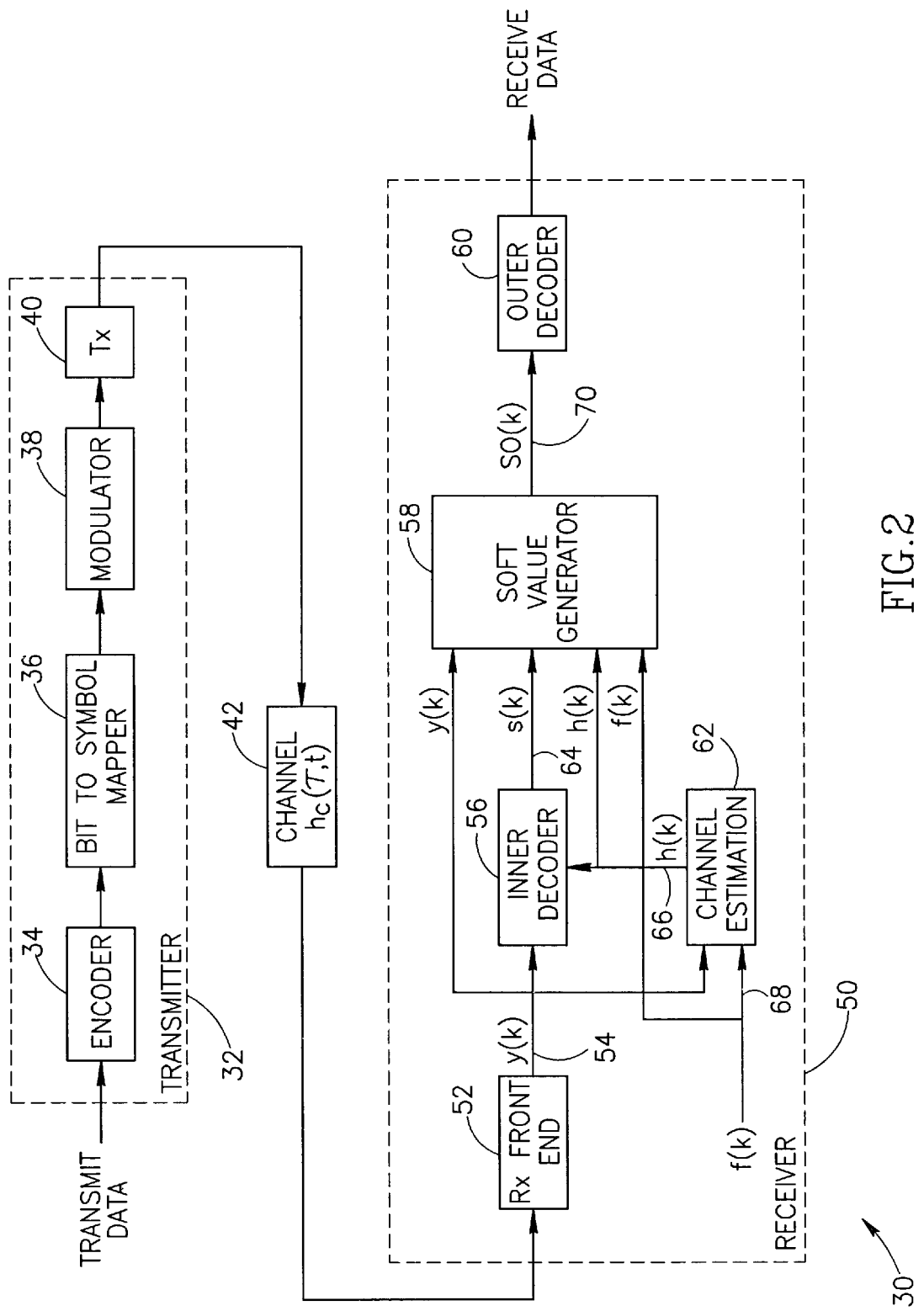
FIG. 2 is a block diagram illustrating a concatenated receiver incorporating a soft value generator of the present invention.

A block diagram illustrating a concatenated receiver incorporating a soft value generator of the present invention is shown in FIG. 2. The communication system, generally referenced 30, comprises a concatenated encoder transmitter 32 coupled to a channel 42, and a concatenated decoder receiver 50. The transmitter 32 comprises an encoder 34, bit to symbol mapper 36 and modulator 38. Input data bits to be transmitted are input to the encoder 34 which may comprise an error correction encoder such as Reed Solomon, convolutional encoder, parity bit generator, etc. The encoder functions to add redundancy bits to enable errors in transmission to be located and fixed.

The bits output of the encoder 34 are mapped to symbols by the symbol mapper 36. The bit to symbol mapper functions to transform bits to modulator symbols taken from an M-ary alphabet. An 8-PSK modulator, for example, converts input bits into one of eight symbols. Thus, the mapper generates a symbol for every three input bits.

The symbols output from the mapper are input to the modulator 38 which functions to receive symbols in the M-ary alphabet and to generate the analog signal therefrom that is subsequently transmitted over the channel 42. The channel may comprise a mobile wireless channel, e.g., cellular, cordless, fixed wireless channel, e.g., satellite, or may comprise a wired channel, e.g., xDSL, ISDN, Ethernet, etc. It is assumed that noise present is added to the signal in the channel. The transmitter is adapted to generate a signal that can be transmitted over the channel to provide robust, error free detection by the receiver.

It is noted that both the inner and outer decoders in the receiver have complimentary encoders, in the transmitter. The outer encoder in the transmitter comprises the encoder 34, e.g., Reed Solomon, etc. The inner encoder comprises the channel 42 which, in one embodiment, can be modeled as an L-symbol long FIR-type channel.

At the receiver 50, the analog signal from the channel is input to Rx front end circuitry 52 which demodulates and samples the received signal to generate received samples y(k) 54. The samples are then input to an inner decoder 56. An example of an inner decoder is an equalizer which compensates for the ISI caused by the delay and time spreading of the channel. Examples of equalizers include the maximum likelihood sequence estimation (MLSE) equalizer that utilizes the well known Viterbi Algorithm (VA), linear equalizer and decision feedback equalizer (DFE). The function of the equalizer is to attempt to detect the symbols that were originally transmitted by the modulator.

Equalization is a well known technique used to combat intersymbol interference whereby the receiver attempts to compensate for the effects of the channel on the transmitted symbols. An equalizer attempts to determine the transmitted data from the received distorted symbols using an estimate of the channel that caused the distortions. In communications systems where ISI arises due to partial response modulation or a frequency selective channel, a maximum likelihood sequence estimation (MLSE) equalizer is optimal. This is the form of equalizer generally used in GSM and GERAN systems.

The MLSE technique is a nonlinear equalization technique applicable when the radio channel can be modeled as a Finite Impulse Response (FIR) system. Such a FIR system requires knowledge of the channel impulse response tap values. The channel estimate is obtained using a known training symbol sequence to estimate the channel impulse response. Other equalization techniques such as DFE or linear equalization require precise knowledge of the channel.

The channel estimation 62 is operative to generate a channel estimate 66 represented by h(k) that is used by both the inner decoder 56 (i.e. equalizer) and the soft value generator 58. The channel estimation is generated using the received input samples y(k) 54 and the training sequence f(k) 68.

Several methods of channel estimation that are known in the art and suitable for use with the present invention include, for example, a correlation method and a least squares method. The correlation method is described in detail in "GSM System Engineering," A. Mehrotra, 1997, Chapter 6 and in the article "On the Minimization of Overhead in Channel Impulse response Measurement," Y. Han, IEEE Transactions on Vehicular Technology, Vol. 47, No. 2, May 1998, pages 631–636. The least square method of channel estimation is described in more detail in the articles "Improved Channel Estimation With Side Information," A. S. Khayrallah, R. Ramesh, G. E. Bottomley, D. Koilpillai, IEEE, March 1997, pages 1049–1051 and "Impact of Blind versus Non-Blind Channel Estimation on the BER Performance of GSM Receivers," D. Boss, T. Petermann, K. Kammeyer, IEEE Signal Processing Workshop on Higher-Order Statistics, Jul. 21, 1997, pages 62–67 and in the book "Adaptive Filter Theory," S. Haykin, 1996, Chapter 11 (Method of Least Squares).

Another channel estimation technique suitable for use with the present invention is described in U.S. patent application Ser. No. 09/616,161, to Yakhnich et al, filed Jul. 14, 2000, entitled "Method of Channel Order Selection and Channel Order Estimation in a Wireless Communication System," similarly assigned and incorporated herein by reference in its entirety.

The output of the inner decoder 56 (i.e. equalizer) comprises hard symbol decisions s(k) 23. The hard decisions are then input to the soft output generator 58 which is operative to output soft decision information given (1) hard symbol decisions s(k) from the inner decoder, (2) channel model information h(k) (e.g., FIR filter taps used to estimate the channel), and (3) the input samples y(k) received from the channel.

The soft decision information SO(k) 70 for a symbol is derived by determining the conditional probability of the input sample sequence given the hard symbol decision sequence, as described in more detail infra. The soft decision calculated is in the form of the log likelihood ratio (LLR) of the conditional probability. In accordance with the invention, the noise variance of the channel is also used by the value generator in generating the soft information.

The log likelihood ratio is defined as the ratio of the probability of a first symbol with a second symbol wherein the second symbol is a reference symbol. The reference symbol is arbitrary as long as it is used consistently for all the soft output values for a particular time k. The reference symbol can, however, vary from time k+1, k+2, etc. Preferably, however, the reference is kept the same throughout.

Note that a hard decision is one of the possible values a symbol s(k) can take. In the ideal case, a soft decision comprises the reliabilities of each possible symbol value. The soft decision comprises a complete information packet that is needed by the decoder. An information packet is defined as the output generated by a detector or decoder in a single operation. (See "Optimum Soft-Output Detection for Channels with Intersymbol Interference," Y. Li, B. Vucetic, Y. Sato, IEEE Transactions on Information Theory, Vol. 41, No. 3, May 1995).

The soft decision information SO(k) output of the soft value generator 58 is input to the outer decoder 60 which is preferably an optimal soft decoder. The outer decoder functions to locate and fix errors using the redundancy bits inserted by the encoder. The outer decoder 60 generates the binary receive data. Examples of the outer decoder 60 include convolutional decoders utilizing the Viterbi Algorithm, convolutional Forward Error Correction (FEC) decoders, turbo decoders, etc. Soft input Viterbi decoders have the advantage of efficiently processing soft decision information and providing optimum performance in the sense of minimum sequence error probability.

Note that optionally, an interleaver/de-interleaver may be added to the system. In this case, a symbol based interleaver/de-interleaver is used. If a bit based interleaver/de-interleaver is used, some mechanism of mapping soft symbols to bits must be used before the outer decoder.

Figure 3:
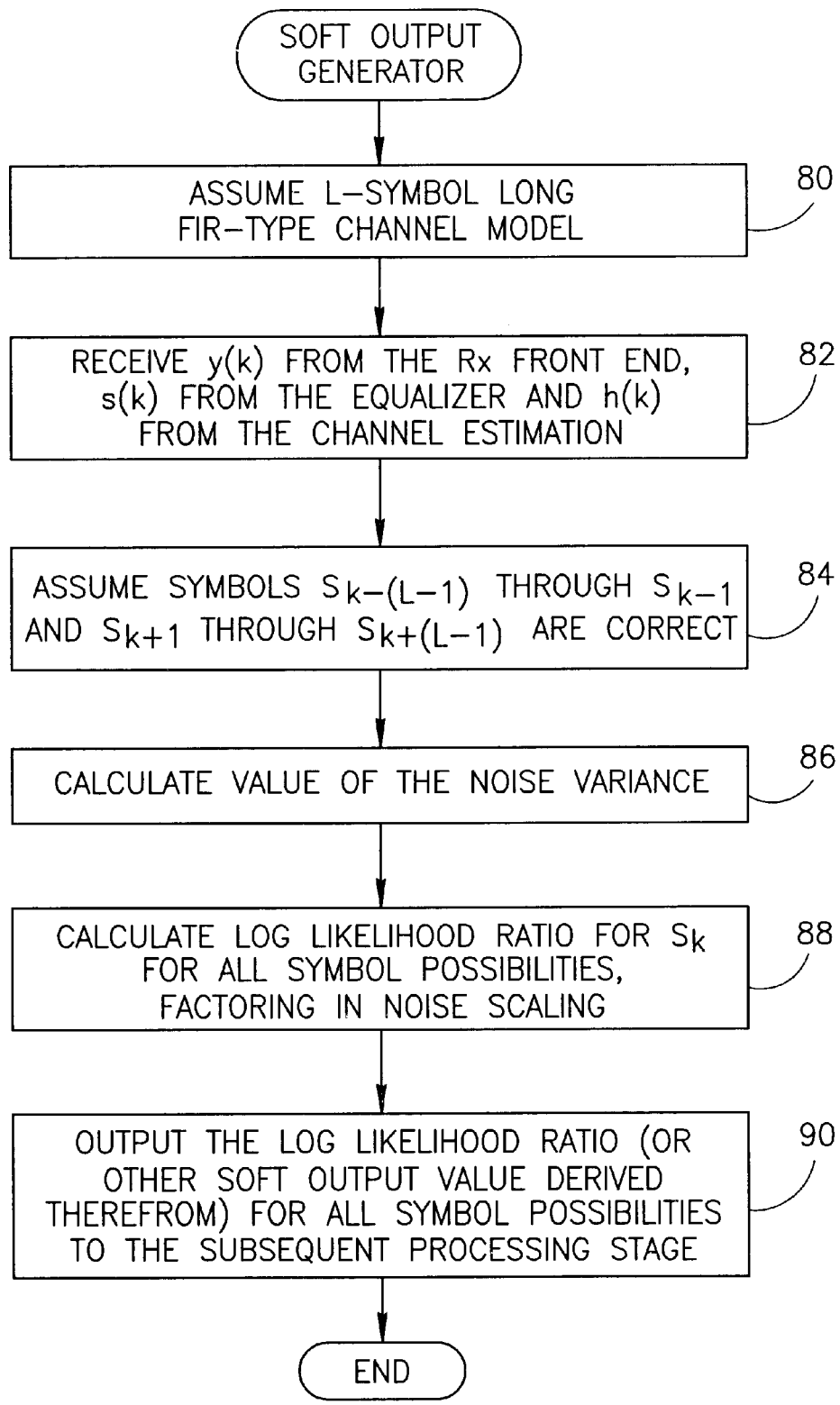
FIG. 3 is a flow diagram illustrating the soft decision generator method of the present invention.

The soft value generator method of the present invention will now be described in more detail. A flow diagram illustrating the soft decision generator method of the present invention is shown in FIG. 3. The method described herein is performed by the soft value generator 58 (FIG. 2). It is assumed that an M-ary modulation scheme is used, with $M=2^m$ and having the alphabet $$A=\{A_0, A_1, \ldots A_{M-1}\}$$

Each symbol can then be represented by m number of bits. The modulation scheme used in GSM EDGE and GSM EDGE Radio Access Network (GERAN) systems is 8-PSK with m=3.

In one embodiment, a channel model is used that assumes the channel has a length L symbols long and comprises a FIR-type channel whose taps can be estimated using a suitable well known estimation technique such as described supra (step 80). The invention, however, is applicable to other types of channels as well, and is not limited to FIR type channels. The channel type example described herein is not intended to limit the scope of the invention.

The method computes the complete information packet for a symbol $s_k$. The complete information packet comprises the Log Ratio of a posteriori probabilities as defined below in Equation 1.

$$\Lambda_{k,i} = \ln\left[\frac{P(s_k = A_i \mid y)}{P(s_k = A_0 \mid y)}\right] \quad (1)$$

wherein y represents the sequence of input samples. Note that alternatively, the invention is adapted to generate a portion (i.e. a subset) of the complete information packet.

The log likelihood ratio of a symbol $s_k$ having the value $A_i$ can be expressed as $$LLR(s_k = A_i) = \ln\left[\frac{P(y \mid s_k = A_i)}{P(y \mid s_k = A_0)}\right] \quad (2)$$

A reasonable assumption can be made that all symbols are equiprobable (this is a valid assumption for most practical communication systems). Therefore, $P(s_k=A_i)=P(s_k=A_0)$ and the following expression for the Log Ratio can be written as $$\begin{aligned}\Lambda_{k,i} &= \ln\left[\frac{P(s_k = A_i \mid y)}{P(s_k = A_0 \mid y)}\right] \\ &= \ln\left[\frac{P(y \mid s_k = A_i)P(s_k = A_i)/P(y)}{P(y \mid s_k = A_0)P(s_k = A_0)/P(y)}\right] \\ &= \ln\left[\frac{P(y \mid s_k = A_i)}{P(y \mid s_k = A_0)}\right] \\ &= LLR(s_k = A_i)\end{aligned} \quad (3)$$

Thus, $\Lambda_{k,i}$ is equivalent to $LLR(s_k=A_i)$. For convenience sake, throughout this document, the Log Likelihood Ratio is referred to rather than the Log A-Posteriori Probability Ratio.

Thus, the log likelihood ratio for a symbol possibility is expressed as the ratio of the conditional probability of a particular symbol possibility (i.e. trial symbol) compared to that of the probability of the symbol $A_0$.

The soft value generator is operative to generate at any time k, for symbol $s_k$, a plurality of soft outputs comprising M−1 values, wherein each value is an approximation of $$LLR(s_k = A_i) \; i=1 \ldots M-1$$

Note that the LLR is the optimum form of soft output when the outer decoder comprises a Viterbi decoder. Note, however, that modifications to the present invention to generate different types of soft output, as is known in the art, is intended to be within the scope of the invention.

The method computes the Log Likelihood Ratio (LLR) of a symbol $s_k$ given (1) the sequence of hard symbol decisions from the inner decoder (i.e. equalizer)

$$s_{k-(L-1)}, s_{k-(L-2)}, \ldots, s_{k-1}, s_k, s_{k+1}, \ldots, s_{k+(L-1)}.$$

(2) T-spaced inner decoder input samples $y_k, \ldots, y_{k+L-1}$ from the Rx front end, and (3) channel estimate taps $h_0, \ldots, h_{L-1}$ from the channel estimation unit (step 82). The input samples can be modeled by the following equation $$y_k = \sum_{i=0}^{L-1} h_i * s_{k-i} + n_k \quad (4)$$

where $y_k$ represents the $k^{th}$ input sample input to the inner decoder (i.e. the equalizer);

$s_{k-1}$ represents the k-$i^{th}$ hard symbol decision;

$h_i$ represents the channel estimate;

$n_k$ represents the zero means, additive white Gaussian noise.

In accordance with the present invention, the noise $n_k$ statistic is factored into the computation of the soft output values, thus resulting in better overall performance of the receiver. In most real world systems, the noise statistic varies with time and cannot be assumed constant, as in the case of GSM and GERAN cellular systems.

Considering the expression for the input sample presented above in Equation 4, the conditional probability of the input sample sequence $y_k, \ldots, y_{k+(L-1)}$ given the hard symbol decision sequence $s_{k-(L-1)}, \ldots s_{k-1}, s_k, s_{k+1}, \ldots, s_{k+(L-1)}$ is given by the following expression $$P(y_k \ldots y_{k+(L-1)} \mid s_{k-(L-1)} \ldots s_{k+(L-1)}) = \quad (5)$$

$$\left(\frac{1}{2\pi\sigma^2}\right)^{\frac{L}{2}} \prod_{i=0}^{L-1} \exp\left\{-\frac{\left|y_{k+i} - \sum_{j=0}^{L-1} h_j s_{k+i-j}\right|^2}{2\sigma^2}\right\}$$

Next, it is assumed that the hard decisions for the symbols $s_{k-(L-1)}, \ldots, s_{k-1}, s_{k+1}, \ldots, s_{k+(L-1)}$ are correct (step 84). It is noted that since the channel has memory which results in ISI, the symbols transmitted both before and after the current symbol $s_k$ effect the received input samples. The method, however, assumes that the symbols both before and after the current one (but not the current symbol $s_k$ itself), are received correctly from the equalizer.

The conditional probability of $s_k=A_l$ can then be expressed as $$P(y_k \ldots y_{k+(L-1)} \mid s_{k-(L+1)} \ldots s_{k-1}, s_{k-1}, s_{k+(L-1)}, s_k = A_l) = \quad (6)$$

$$\left(\frac{1}{2\pi\sigma^2}\right)^{\frac{L}{2}} \prod_{i=0}^{L-1} \exp\left\{-\frac{\left|y_{k+i} - \sum_{j=0, i \neq j}^{L-1} h_j s_{k+i-j} - h_i A_l\right|^2}{2\sigma^2}\right\}$$

Note that in this equation, the current symbol $s_k$ is fixed to the trial symbol $A_l$. Taking the natural logarithm and the ratio, the likelihood ratio (LLR) can be expressed as $$LLR(s_k = A_l) = \sum_{i=0}^{L-1} \frac{-\left|y_{k+i} - \sum_{j=0,j\neq i}^{L-1} h_j s_{k+i-j} - h_i A_l\right|^2 + \left|y_{k+i} - \sum_{j=0,j\neq i}^{L-1} h_j s_{k+i-j} - h_i A_0\right|^2}{2\sigma^2} \quad (7)$$

wherein the $2\sigma^2$ term is a constant representing the noise variance. The noise variance can be determined using the training sequence that is transmitted along with the information in many of the commonly used communications protocols (step 86). In GSM systems, for example, a training sequence is transmitted within each burst in the midamble of the burst. In other schemes, the training sequence is transmitted as a preamble.

To determine the noise variance, the ideal training sequence f(k) is convolved with the channel estimate h(k) and the results are subtracted from the received training sequence $\hat{f}(k)$ as expressed below $$\sigma \propto f(k) * h(k) - \hat{f}(k) \quad (8)$$

The resulting difference is a reasonable estimate of the noise in the received signal. Note that if the noise is known to be constant within a block of data, it can be ignored. This, however, is not the case in mobile channel communications system such as cellular systems. Note that alternatively, the inner decoder (e.g., the equalizer) can be adapted to provide a noise variance value. The noise variance value can be generated as a function of training noise variance or a function of the maximum likelihood path noise variance derived from the Viterbi Algorithm decoder.

Using the expression for the LLR given in Equation 7, a soft decision value that factors in the noise scaling is calculated for each of the trial symbols $A_0$ to $A_{M-1}$. The LLR values for each trial symbol are then output to the subsequent processing stage which in most cases is the outer decoder (step 90).

Soft Output Generator Apparatus

Figure 4:
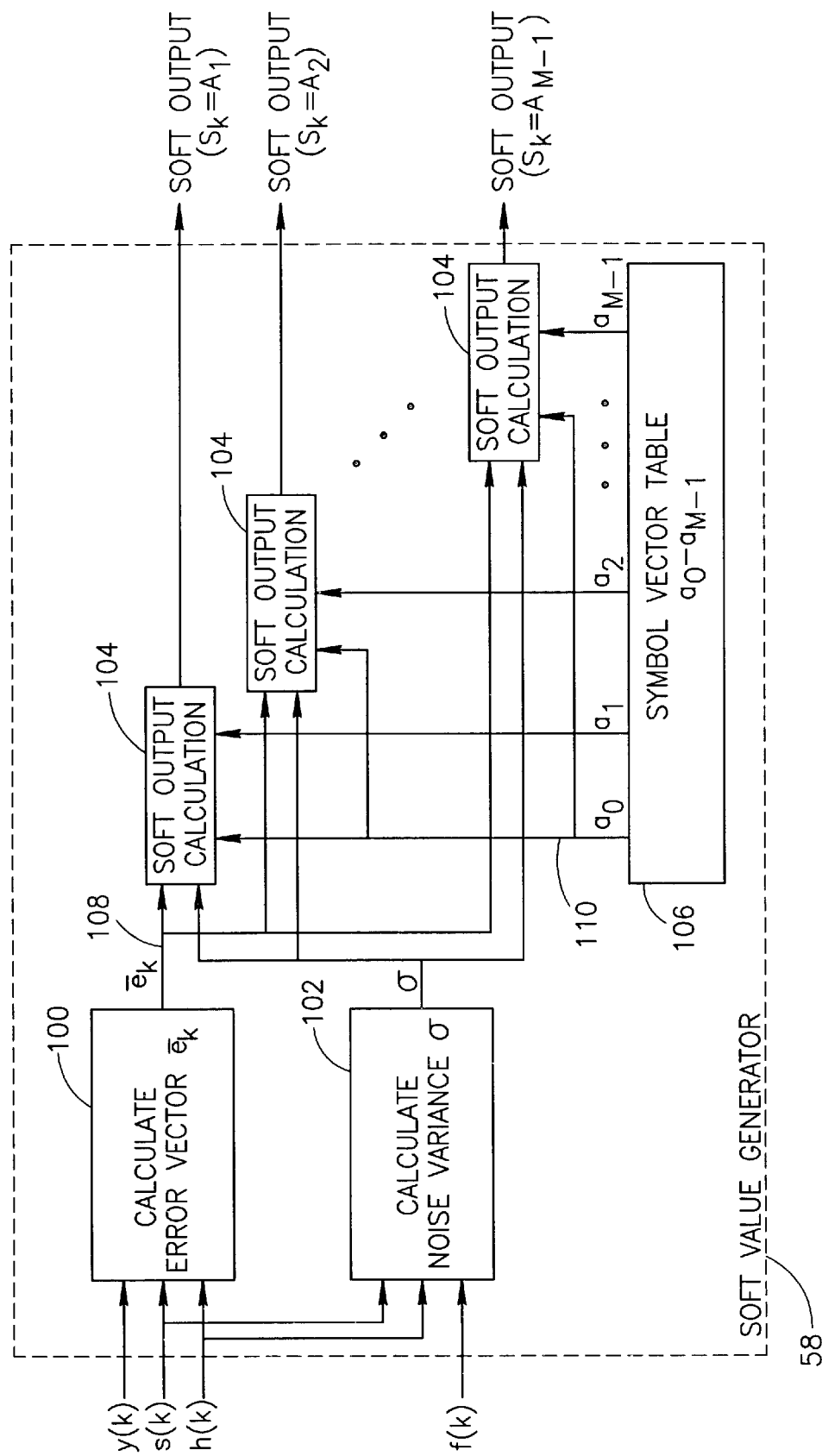
FIG. 4 is a block diagram illustrating an example embodiment of the soft value generator of the present invention in more detail.

The expression for the LLR given in Equation 7 can be implemented in either hardware or software. A block diagram illustrating an example embodiment of the soft value generator of the present invention in more detail is shown in FIG. 4. In this example embodiment, the soft value generator 58 uses symbol vectors calculated beforehand and stored in symbol vector table 106. An error vector calculator 100 functions to calculate an error vector $\bar{e}_k$ that is applied to a plurality of soft output calculation units 104. Each soft output calculation unit functions to generate a soft output value for a particular symbol possibility.

Considering Equation 7, the following can be defined $$d_k = y_{k+i} - \sum_{j=0,j\neq i}^{L-1} h_j s_{k+i-j} \quad (9)$$

and $$\bar{d}_k = [d_k \ldots d_{k+L-1}]^T$$
$$\bar{a}_l = [h_0 A_l \ldots h_{L-1} A_l]^T$$
$$\bar{y}_k = [y_k \ldots y_{k-L}]^T$$
$$\bar{e}_k = \bar{y}_k - \bar{d}_k \quad (10)$$

wherein $\bar{a}_l$ is a symbol vector, $\bar{y}_k$ is the input sample vector and $\bar{e}_k$ is an error vector. The expression for Equation 7 can be rewritten in terms of Equations 9 and 10 as $$SO(s_k = A_l) = \frac{(\bar{e}_k - \bar{a}_0)^H (\bar{e}_k - \bar{a}_0) - (\bar{e}_k - \bar{a}_l)^H (\bar{e}_k - \bar{a}_l)}{\sigma^2} \quad (11)$$

Note that vectors $a_l$ are independent of the hard decisions $s_k$. Therefore, they can be computed beforehand and stored in memory, e.g., RAM, ROM, etc., or stored in a data structure on a computer. Using the expression in Equation 11, the soft outputs SO can be efficiently computed by first computing the error vector $\bar{e}_k$ and then, using the known pre-computed vectors $\bar{a}_l$, the M−1 soft outputs are computed for each $s_k$.

The apparatus shown in FIG. 4 performs this operation using the error vector calculation unit 100 and soft output calculation units 104. The error vector calculator 100 receives the input samples y(k), hard decisions s(k), channel estimate h(k) and has knowledge of the ideal training sequence f(k). The noise variance calculator 102 functions to determine the noise variance using Equation 8 as described above. Each of the soft output calculation units implements the expression in Equation 11. Each is adapted to receive the error vector, $a_0$ vector, one of the vectors $a_1$ through $a_{M-1}$, and the noise variance $\sigma$. A soft decision is generated for each trial symbol via a soft output calculation unit.

In applications where the noise variance can be ignored, one skilled in the art can modify Equations 5, 6, 7 and 11 so as to eliminate the noise variance factor from the calculation for the soft outputs. In this case, step 86 of the method of FIG. 3 need not be performed. In addition, the noise variance calculation module 102 of the apparatus in FIG. 4 is not required and the soft output calculation modules 104 are modified accordingly to not use the noise variance in their calculations.

In an alternative embodiment, the inner decoder is adapted to calculate the error vectors $\bar{e}_k$ rather than the soft output generator. In this case, the soft output generator operates the same except that the error vectors are now provided by the inner decoder (i.e. the equalizer), thus relieving the soft output generator of the computation burden.

The invention provides several advantages. One advantage of the invention is that the generation of soft decision information is independent of the type of equalizer used in the receiver. This permits soft value information to be generated in a receiver that incorporates a Low Complexity Equalizer as well as in one that incorporates a Full Complexity Maximum Likelihood Equalizer. Another benefit is that the soft output generator method is computationally efficient in that a minimum number of arithmetic operations are required to implement it. In addition, the method does not require any additional memory and performs relatively well for good to moderate values of SER.

GSM EDGE Embodiment

Figure 5:
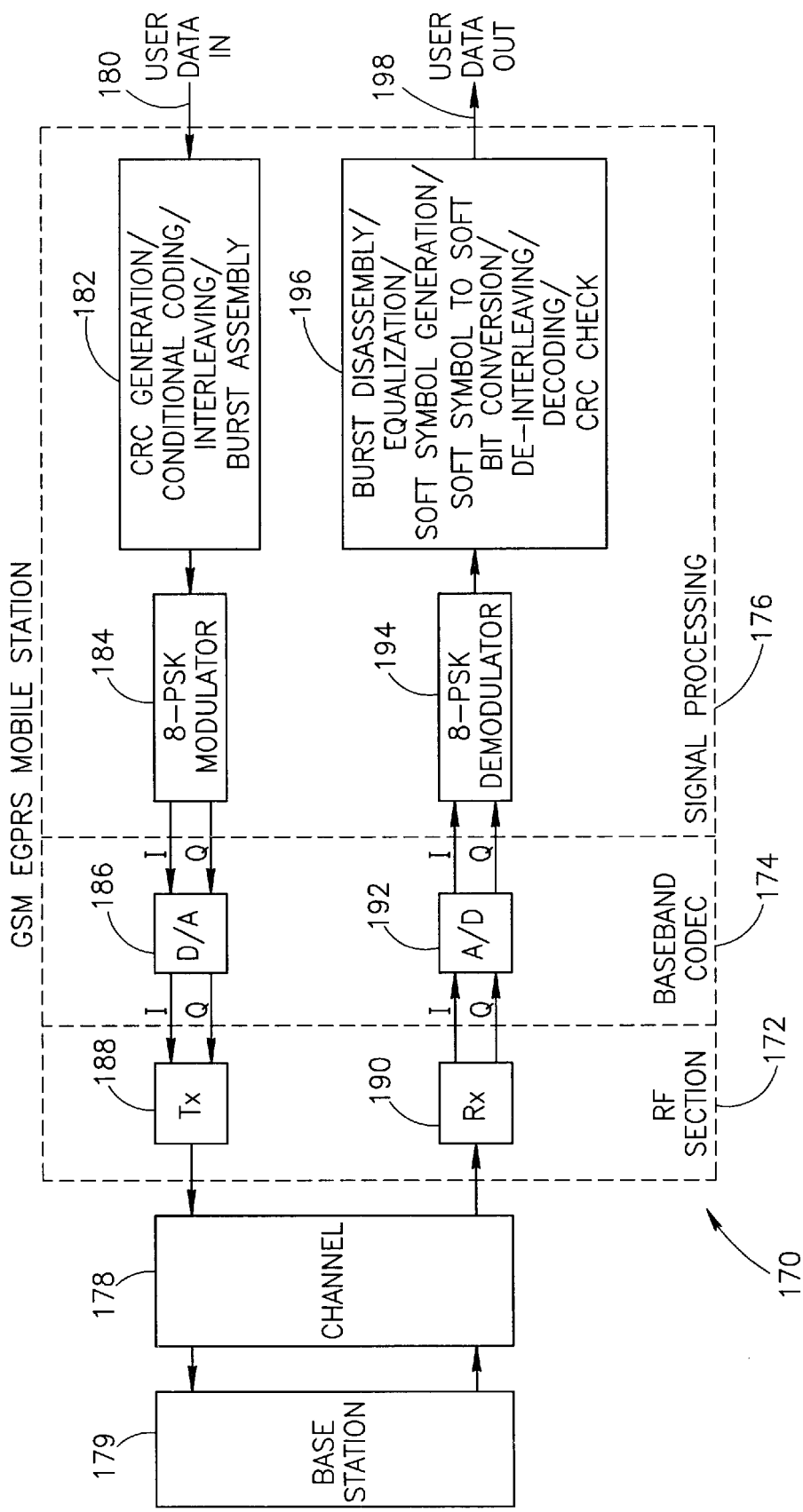
FIG. 5 is a block diagram illustrating the functional processing blocks in a GSM EDGE mobile radio station.

A GSM EGPRS mobile station constructed to comprise means for performing the soft symbol generation method of the present invention is presented. A block diagram illustrating the functional processing blocks in a GSM EGPRS mobile radio station is shown in FIG. 5. The radio station is designed to provide reliable data communications at rates of up to 384 kbit/s. The GSM EGPRS mobile station, generally referenced 170, comprises a transmitter and receiver divided into the following sections: signal processing circuitry 176, baseband codec 174 and RF circuitry section 172.

In the transmit direction, the signal processing portion 176 functions to protect the data so as to provide reliable communications between the transmitter and the base station 179 over the channel 178. Several processes performed by the channel coding block 182 are used to protect the user data 180 including cyclic redundancy code (CRC) check, convolutional coding, interleaving and burst assembly. The resultant data is assembled into bursts whereby guard and tail symbols are added in addition to a training sequence midamble that is added to the middle of the burst. Note that both the user data and the signaling information go through similar processing. The assembled burst is then modulated by a modulator 184 which may be implemented as a 3π/8 offset 8-PSK modulator.

In the receive direction, the output of the baseband codec is demodulated using a complementary 8-PSK demodulator 194. Several processes performed by the channel decoding block 196 in the signal processing section 176 are then applied to the demodulated output. The processes performed include burst disassembly, equalization, soft symbol generation in accordance with the present invention, soft symbol to soft bit conversion, de-interleaving, convolutional decoding and CRC check.

The baseband codec 174 converts the transmit and receive data into analog and digital signals, respectively, via D/A converter 186 and A/D converter 192. The transmit D/A converter provides analog baseband I and Q signals to the transmitter 188 in the RF circuitry section 172. The I and Q signals are used to modulate the carrier for transmission over the channel.

In the receive direction, the signal transmitted by the base station over the channel is received by the receiver circuitry 190. The analog signals I and Q output from the receiver are converted back into a digital data stream via A/D converter 192. The I and Q digital data streams are filtered and demodulated by 8-PSK demodulator 194 before being input to the channel decoding block 196. Several processes performed by signal processing block 196 are then applied to the demodulated output.

In addition, the mobile station performs other higher level functions such as synchronization, frequency and time acquisition and tracking, monitoring, measurements of received signal strength and control of the radio. Other functions include handling the user interface, signaling between the mobile station and the network, the SIM interface, etc.

Simulation Results

To illustrate the benefits of the soft symbol generator of the present invention, a GSM Enhanced General Packet Radio System (EGPRS) was simulated and the results are presented herein. The simulation was performed assuming the MCS5 coding scheme, a typical urban channel for a mobile unit moving at a velocity of 50 km/h (TU50), a 900 MHz frequency band, no frequency hopping and with the addition of Additive White Gaussian Noise (AWGN).

Figure 6:
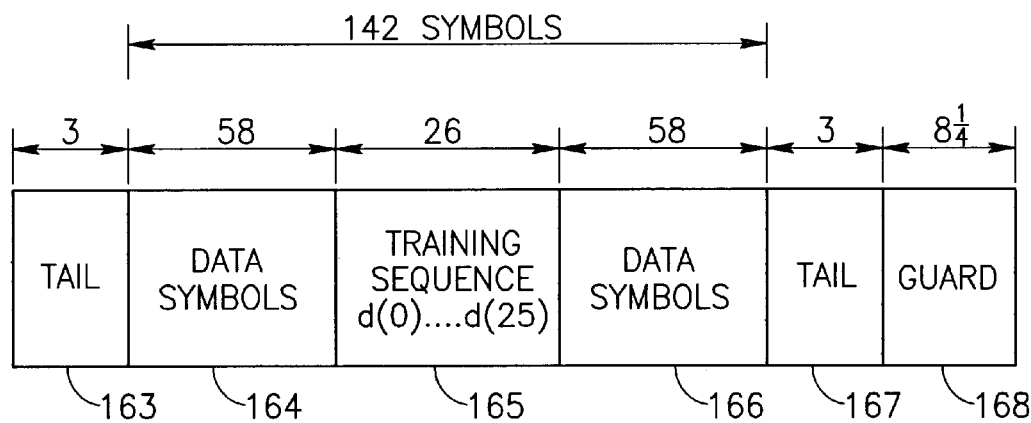
FIG. 6 is a diagram illustrating the structure of a GSM burst.

The EGPRS system is a Time Division Multiple Access (TDMA) system wherein eight users are able to share the same carrier frequency. In an EGPRS transmitter, the data bits are encoded with a rate ⅓ convolutional encoder, interleaved and mapped to 8-ary symbols. The resultant coded data symbols together with the training sequence are assembled into a burst of 142 symbols as shown in FIG. 6.

In GSM, the training sequence is sent in the middle of each burst. Each fixed length burst 160 consists of 142 symbols preceded by a 3 symbol tail 163 and followed by a 3 symbol tail 167 and 8.25 symbol guard 168. The 142 symbols include a 58 symbol data portion 164, 26 symbol training sequence 165 and another 58 symbol data portion 166. Since the training sequence is sent in the middle of the burst, it is referred to as a midamble. It is inserted in the middle of the burst in order to minimize the maximum distance to a data symbol thus minimizing the time varying effects at the ends of the burst.

The burst is then modulated using 3π/8-offset 8-PSK with Gaussian pulse shaping in accordance with the GSM standard. The modulated output is transmitted over a frequency selective Gaussian channel utilizing punctured rate ⅓ convolutional coding. An MLSE type equalizer with a Least Squares type channel estimator was used in the receiver. The receiver was adapted to generate soft decision information in accordance with the present invention. A Viterbi Algorithm based convolutional decoder was used as the outer decoder. The soft decision outputs of the generator 58, calculated in accordance with the invention, were used as input for the soft decoding.

Figure 7:
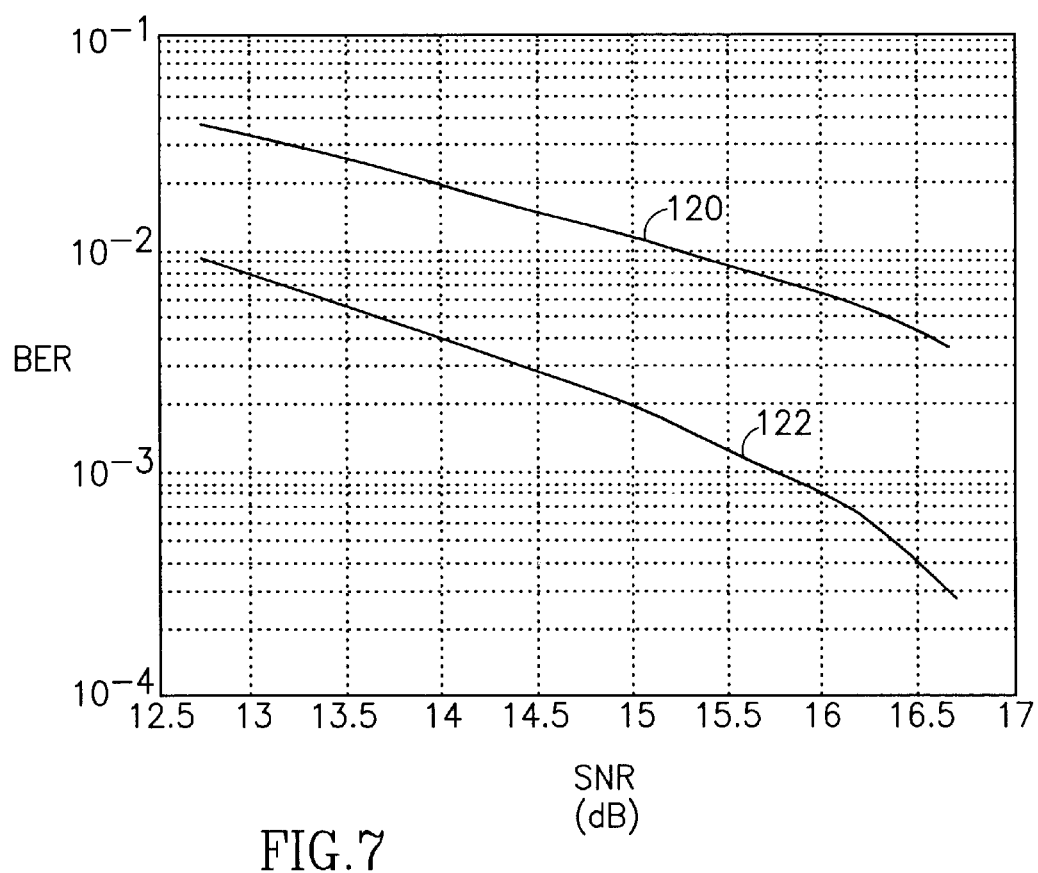
FIG. 7 is a graph illustrating BER at the output of the outer decoder versus SNR for a concatenated communications receiver constructed with and without the soft output generator of the present invention.

A graph illustrating BER at the output of the outer decoder versus SNR for a concatenated communications receiver constructed with and without the soft decision generator of the present invention is shown in FIG. 7. The solid curve 120 represents the BER at the output of the outer decoder when hard decisions only were used by the decoder. The solid curve 122 represents the BER versus SNR when soft decisions calculated using suboptimal LLR were used by the decoder. It can be seen that performance gains of several dBs can be achieved using the present invention when compared to hard decision decoding. For example, at a BER of $10^{-2}$, a performance gain of approximately 2.5 dB is achieved when using the soft decision information.

Computer Embodiment

Figure 8:
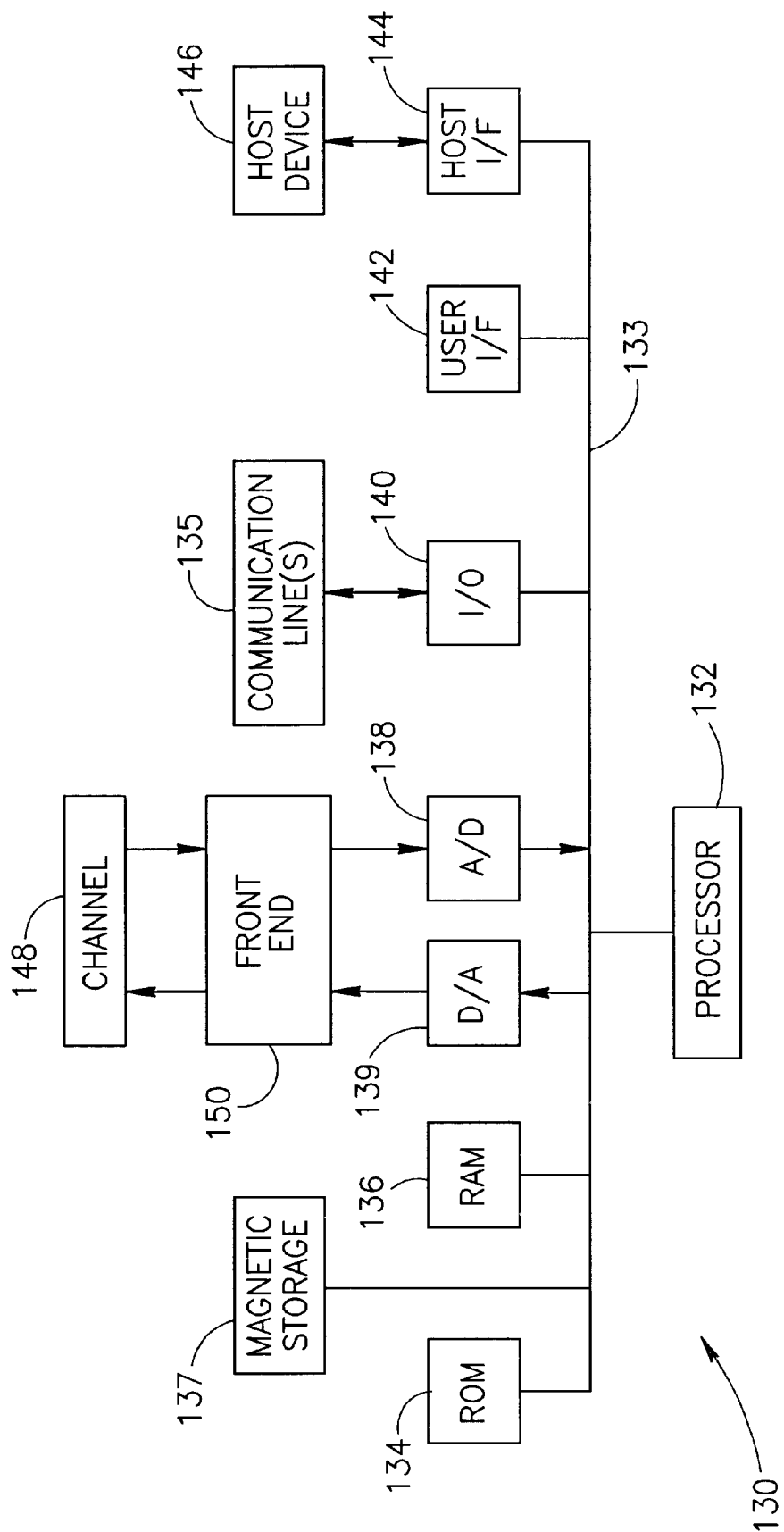
FIG. 8 is a block diagram illustrating an example computer processing system adapted to perform the soft output generator method of the present invention.

In another embodiment, a computer is operative to execute software adapted to perform the soft output generator method of the present invention. A block diagram illustrating an example computer processing system adapted to perform the soft output generation method of the present invention is shown in FIG. 8. The system may be incorporated within a communications device such as a receiver part of which is implemented in software.

The computer system, generally referenced 130, comprises a processor or central processing unit (CPU) 132 such as a digital signal processor (DSP), static read only memory 134 and dynamic main memory 136 all in communication with the processor which may comprise a microcontroller, microprocessor or microcomputer. The processor is also in communication, via a bus 133, with a number of peripheral devices that are also included in the computer system. An A/D converter 138 functions to sample the baseband signal output of the front end circuit 150 coupled to the channel 148. Samples generated by the processor are input to the front end circuit via D/A converter 139.

One or more communication lines 135 are connected to the system via I/O interface 140. A user interface 142 responds to user inputs and provides feedback and other status information. A host interface 144 connects a host device 146 to the system. The host is adapted to configure, control and maintain the operation of the system. The system also comprises magnetic storage device 137 for storing application programs and data. The system comprises computer readable storage medium which may include any suitable memory means including but not limited to magnetic storage, optical storage, semiconductor volatile or non-volatile memory, biological memory devices, or any other memory storage device.

The soft decision information generation software is adapted to reside on a computer readable medium, such as a magnetic disk within a disk drive unit, e.g., hard disk drive media, floppy drive media, etc. Alternatively, the computer readable medium may comprise a floppy disk, Flash memory card, EEROM based memory, bubble memory storage, ROM storage, RAM, etc. The soft decision information generator software may also reside, in whole or in part, in the static or dynamic main memories or in firmware within the processor of the computer system (i.e. within microcontroller, microprocessor or microcomputer internal memory).

The soft value output generated is preferably stored in semiconductor memory, e.g., RAM, since the access times are much shorter than with other types of memory such as magnetic memory storage. Magnetic media may be used, however, in the case where the system includes long time delays wherein large amounts of data must be stored.

In alternative embodiments, the method of the present invention may be applicable to implementations of the invention in integrated circuits, field programmable gate arrays (FPGAs), chip sets or application specific integrated circuits (ASICs), wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of generating soft decision information for an M-ary symbol in a communication receiver coupled to a channel wherein said communication receiver includes a first decoder adapted to generate a sequence of hard symbol decisions from a received signal, said method comprising the steps of:
   providing said sequence of hard symbol decisions from said first decoder;
   providing a plurality of input samples generated in accordance with said received signal;
   providing an estimate of said channel and its length; and
   generating a soft decision value for one or more possible values of said M-ary symbol for each given symbol wherein each soft decision value is calculated as a function of said sequence of hard symbol decisions, said plurality of input samples, said channel estimate and the length of said channel.

2. The method according to claim 1, wherein said communications receiver is adapted to receive and decode a global system for mobile communication (GSM) signal.

3. The method according to claim 1, wherein said communications receiver is adapted to receive and decode a GSM EDGE Radio Access Network (GERAN) system signal.

4. The method according to claim 1, further comprising the step of providing a second decoder operative to generate receive binary data in accordance with said soft decision values.

5. The method according to claim 4, wherein said second decoder comprises a convolutional decoder based on the Viterbi Algorithm (VA).

6. The method according to claim 1, wherein said M-ary symbol comprises an 8-PSK symbol.

7. The method according to claim 1, further comprising the step of generating said soft decision value represented as a log likelihood ratio (LLR).

8. The method according to claim 1, wherein said step of providing a noise variance value utilizes said sequence of hard symbol decisions and said channel estimate.

9. The method according to claim 1, wherein said first decoder comprises a maximum likelihood sequence estimation (MLSE) equalizer based on the Viterbi Algorithm (VA).

10. The method according to claim 1, wherein said first decoder comprises means for performing a sub-optimal complexity reduced maximum likelihood sequence estimation (MLSE) technique based on the Viterbi Algorithm (VA).

11. The method according to claim 1, further comprising the step of generating a noise variance value and generating a soft decision value as a function therewith.

12. The method according to claim 11, wherein said step of providing a noise variance value comprises the steps of:
   calculating the convolution of an ideal training sequence with said channel estimate;
   subtracting the results of said convolution from a received training sequence; and
   setting said noise variance value to the difference generated thereby.

13. The method according to claim 1, further comprising the step of providing a noise variance value generated by said first decoder.

14. The method according to claim 1, further comprising the step of providing a noise variance value generated as a function of training noise variance.

15. The method according to claim 1, further comprising the step of providing a noise variance value generated as a function of maximum likelihood path noise variance.

16. The method according to claim 1, wherein said first decoder comprises a decision feedback equalizer (DFE).

17. The method according to claim 1, wherein said first decoder comprises a linear type equalizer.

18. The method according to claim 1, wherein said first soft decision values are generated in accordance with the function given by $$LLR(s_k = A_l) = \sum_{i=0}^{L-1} \left( -\left| y_{k+i} - \sum_{j=0, j\neq i}^{L-1} h_j s_{k+i-j} - h_l A_l \right|^2 + \left| y_{k+i} - \sum_{j=0, j\neq i}^{L-1} h_j s_{k+i-j} - h_j A_0 \right|^2 \right)$$

wherein LLR is the log likelihood ratio representing the soft decision value, s represents hard symbol decisions, A represents candidate symbols, y represents input samples, h represents the channel estimate, L represents the channel length, i,j,k are time indices and l is a symbol index.

19. The method according to claim 1, wherein said soft decision values are generated in accordance with the function given by $$LLR(s_k = A_l) = \sum_{i=0}^{L-1} \frac{-\left| y_{k+1} - \sum_{j=0, j\neq i}^{L-1} h_j s_{k+i-j} - h_l A_l \right|^2 + \left| y_{k+i} - \sum_{j=0, j\neq i}^{L-1} h_j s_{k+i-j} - h_l A_0 \right|^2}{(2\sigma^2)}$$

wherein LLR is the log likelihood ratio representing the soft decision value, s represents hard symbol decisions, A represents candidate symbols, y represents input samples, h represents the channel estimate, L represents the channel length, $\sigma^2$ represents the noise variance, i,j,k are time indices and l is a symbol index.

20. A communications receiver for receiving and decoding an M-ary transmitted signal, comprising:
- a radio frequency (RF) front end circuit for receiving and converting said M-ary transmitted signal to a baseband signal;
- a demodulator adapted to receive said baseband signal and to generate a received signal therefrom in accordance with the M-ary modulation scheme used to generate said transmitted signal;
- a first decoder operative to receive said received signal and to generate a sequence of hard symbol decisions therefrom;
- a soft output generator comprising processing means programmed to:
  - receive said sequence of hard symbol decisions from said first decoder;
  - receive a plurality of input samples generated based on said received signal;
  - receive an estimate of said channel and its length;
  - generate a soft decision value for one or more possible values of said M-ary symbol for each given symbol wherein each soft decision value is calculated as a function of said sequence of hard symbol decisions, said plurality of input samples, said channel estimate and the length of said channel; and
- a second decoder adapted to receive said soft output values and to generate binary received data therefrom.

21. The receiver according to claim 20, further comprising a speech decoder operative to convert said decoded output data signal to an audible speech signal.

22. The receiver according to claim 20, further comprising circuit switch data means for converting said decoded output data signal to a data stream.

23. The receiver according to claim 20, further comprising packet switch data means for converting said decoded output data signal to a stream.

24. The receiver according to claim 20, wherein said communications receiver is adapted to receive and decode a Global System for Mobile Communication (GSM) EDGE signal.

25. The receiver according to claim 20, wherein said communications receiver is adapted to receive and decode a GSM EDGE Radio Access Network (GERAN) system signal.

26. The receiver according to claim 20, wherein said second decoder comprises a convolutional decoder based on the Viterbi Algorithm (VA).

27. The receiver according to claim 20, wherein said M-ary symbol comprises an 8-PSK symbol.

28. The receiver according to claim 20, wherein said soft output generator is adapted to generate said soft decision value represented as a log likelihood ratio (LLR).

29. The receiver according to claim 20, wherein said first decoder comprises a maximum likelihood sequence estimation (MLSE) equals based on the Viterbi Algorithm (VA).

30. The receiver according to claim 20, wherein said first decoder comprises means for performing a sub-optimal complexity reduced maximum likelihood sequence estimation (MLSE) technique based on the Viterbi Algorithm (VA).

31. The method according to claim 20, wherein said soft output generator is adapted to generate a noise variance value and generate a soft decision value as a function therewith.

32. The receiver according to claim 20, wherein said soft output generator is adapted to generate a noise variance value utilizing said sequence of bard symbol decisions and said channel estimate.

33. The receiver according to claim 20, further comprising a noise variance calculator adapted to generate a noise variance value by:
- calculating the convolution of an ideal training sequence with said channel estimate;
- subtracting the results of said convolution from a received training sequence; and
- setting said noise variance value to the difference generated thereby.

34. The receiver according to claim 20, wherein said first decoder is adapted to generate a noise variance value.

35. The receiver according to claim 20, wherein said fist decoder is adapted to generate a noise variance value as a function of training noise variance.

36. The receiver according to claim 20, wherein said first decoder is adapted to generate a noise variance value as a function of maximum likelihood path noise variance.

37. The receiver according to claim 20, wherein said first decoder comprises a Decision Feedback Equalizer (DFE).

38. The receiver according to claim 20, wherein said first decoder comprises a linear type equalizer.

39. The receiver according to claim 20, wherein said soft decision values are generated in accordance with the function given by $$LLR(s_k - A_l) = \sum_{i=0}^{L-1} \left( -\left| y_{k+i} - \sum_{j=0, j \neq i}^{L-1} h_j s_{k+i-j} - h_l A_l \right|^2 + \left| y_{k+i} - \sum_{j=0, j \neq i}^{L-1} h_j s_{k+i-j} - h_j A_0 \right|^2 \right)$$

wherein LLR is the log likelihood ratio representing the soft decision value, s represents hard symbol decisions, A represents candidate symbols, y represents input samples, h represents the channel estimate, L represents the channel length, i,j,k are time indices and l is a symbol index.

40. An electronic data storage media sting a computer program a ted to program a computer to execute the soft output generator process of claim 20.

41. An apparatus for generating soft decision information for an M-ary symbol in a communication receiver coupled to a channel wherein said communication receiver includes a first decoder adapted to generate sequence of hard symbol decisions from input samples generated from a received signal, comprising:
- error calculator means operative to generate an error vector at each symbol time as a function of said input samples, an estimate of said channel and its length and said sequence of hard symbol decisions;
- a symbol vector table comprising a plurality of symbol vectors generated for all possible symbol values; and
- soft output calculation means adapted to generate a soft output value for each symbol possibility as a function of said error vector and said plurality of symbol vectors.

42. The apparatus according to claim 41, wherein the values stored in said symbol vector table are calculated a priori.

43. The apparatus according to claim 41, wherein said symbol vector table comprises a Read Only Memory (ROM) device.

44. The apparatus according to claim 41, wherein said symbol vector table comprises a data structure for storing symbol vector data, said data structure contained in a memory.

45. The apparatus according to claim 41, wherein said symbol vector table comprises symbol vectors given by $\bar{a}_l=[h_0A_l \ldots h_{L-1}A_l]^T$, wherein $A_l$ represents one of M−1 possible values for each symbol and $h_A$ is the $k^{th}$ channel estimate tap.

46. The apparatus according to claim 41, wherein said error calculator means is adapted to calculate said error vector according to the following expressions $$d_k = y_{k+i} - \sum_{j=0, j\neq l}^{L-1} h_j s_{k+i-j}$$

and $$\bar{d}_k=[d_k \ldots d_{k+L-1}]^T$$
$$\bar{a}_l=[h_0A_l \ldots h_{L-1}A_l]^T$$
$$\bar{y}_k=[y_k \ldots y_{k-L}]^T$$
$$\bar{e}_k=\bar{y}_k-\bar{d}_k$$

wherein s represents hard decision values, d represents a difference value, L represents the channel length, A represents symbol candidates, h represents the channel estimate, $\bar{a}$ represents symbol vectors, $\bar{y}$ represents input sample vectors, $\bar{e}$ represents error vectors, i,j,k are time indices and l is a symbol index.

47. The apparatus according to claim 46, wherein $e_k$ relating to the maximum likelihood path is generated within said first decoder.

48. The apparatus according to claim 46, wherein $d_k$ relates to the maximum likelihood path generated in said first decoder.

49. The apparatus according to claim 41, wherein said noise determination means is adapted to:

calculate the convolution of an ideal training sequence with said channel estimate;

subtract the results of said convolution from a received training sequence; and set said noise variance value to the difference generated thereby.

50. The apparatus according to claim 41, further comprising noise determination means adapted to generate a noise variance as a function of said sequence of hard symbol decisions and said plurality of input samples and wherein said soft output calculation means is adapted to generate said soft output value as a function of said noise variance generated thereby.

51. The receiver according to claim 41, wherein said first decoder is adapted to generate a noise variance value.

52. The receiver according to claim 41, wherein said first decoder is adapted to generate a noise variance value as a function of training noise variance.

53. The receiver according to claim 41, wherein said first decoder is adapted to generate a noise variance value as a function of maximum likelihood path noise variance.

54. The apparatus according to claim 41, wherein said soft output calculation means is adapted to calculate said soft output value according to the following function $$SO(s_k = A_l) = \frac{(\bar{e}_k - \bar{a}_0)^H(\bar{e}_k - \bar{a}_0) - (\bar{e}_k - \bar{a}_l)^H(\bar{e}_k - \bar{a}_l)}{\sigma^2}$$

wherein SO represents a soft output value, s represents hard decision values, A represents symbol candidates, $\bar{a}$ represents a symbol vector, $\bar{e}$ represents error vectors, $\sigma^2$ represents the noise variance, k is a time index and l is a symbol index.

55. The apparatus according to claim 41, wherein said soft output calculation means is adapted to calculate said soft output value according to the following function $$SO(s_k=A_l)=(\bar{e}_k-\bar{a}_0)^H(\bar{e}_k-\bar{a}_0)-(\bar{e}_k-\bar{a}_l)^H(\bar{e}_k-\bar{a}_l)$$

wherein SO represents a soft output value, s represents hard decision values, A represents symbol candidates, $\bar{a}$ represents a symbol vector, $\bar{e}$ represents error vectors, k is a time index and l is a symbol index.

56. The apparatus according to claim 41, wherein said communications receiver is adapted to receive and decode a global system for mobile communication (GSM) signal.

57. The apparatus according to claim 41, wherein said communications receiver is adapted to receive and decode a GSM EDGE Radio Access Network (GERAN) system signal.

58. The apparatus according to claim 41, further comprising the step of providing a second decoder operative to generate receive binary data in accordance with said soft decision values.

59. The apparatus according to claim 41, wherein said M-ary symbol comprises an 8-PSK symbol.

60. The apparatus according to claim 41, further comprising the step of generating said soft decision value represented as a log likelihood ratio (LLR).

61. A method of generating soft decision information for an M-ary symbol from a sequence of hard symbol decisions generated by a decoder, wherein said decoder adapted to receive input samples from a channel coupled thereto, said method comprising the steps of:

providing a plurality of input samples generated in accordance with a received signal;

providing an estimate of said channel and its length;

generating an error vector at each symbol time as a function of said input samples, said channel estimate, said channel length and said sequence of hard symbol decisions;

providing a symbol vector table comprising a plurality of symbol vectors generated for all possible symbol values; and generating a soft output value for each symbol possibility as a function of said error vector and said plurality of symbol vectors.

62. The method according to claim 61, wherein the values stored in said symbol vector table are calculated a priori.

63. The method according to claim 61, wherein said symbol vector table comprises a Read Only Memory (ROM) device.

64. The method according to claim 61, wherein said symbol vector table comprises a data structure for storing symbol vector data, said data structure contained in a memory.

65. The method according to claim 61, wherein said symbol vector table comprises symbol vectors given by $\bar{a}_l=[h_0A_l \ldots h_{L-1}A_l]^T$, wherein a represents a symbol vector, h represents channel estimates, A represents candidate symbol values, L represents the channel length, and l represents a symbol index.

66. The method according to claim 61, wherein said error vector is calculated according to the following function $$d_k = y_{k+l} - \sum_{j=0, j\neq l}^{L-1} h_j s_{k+i-j}$$

and $$\bar{d}_k = [d_k \ldots d_{k+L-1}]^T$$
$$\bar{a}_l = [h_0 A_l \ldots h_{L-1} A_l]^T$$
$$\bar{y}_k = [y_k \ldots y_{k-L}]^T$$
$$\bar{e}_k = \bar{y}_k - \bar{d}_k$$

wherein s represents hard decision values, d represents a difference value, L represents the channel length, A represents symbol candidates, h represents the channel estimate, $\bar{a}$ represents symbol vectors, $\bar{y}$ represents input sample vectors, $\bar{e}$ represents error vectors, i,j,k are time indices and l is a symbol index.

67. The method according to claim 61, further comprising the step of generating a noise variance value as a function of said sequence of hard symbol decisions and said received input samples and wherein said soft output value is generated also as a function of said noise variance.

68. The method according to claim 67, wherein said step of generating said noise variance value comprises the steps of:
   calculating the convolution of an ideal training sequence with said channel estimate;
   subtracting the results of said convolution from a received training sequence; and
   setting said noise variance value to the difference generated thereby.

69. The method according to claim 61, further comprising the step of providing a noise variance value generated by said first decoder.

70. The method according to claim 61, further comprising the step of providing a noise variance value generated as a function of training noise variance.

71. The method according to claim 61, further comprising the step of providing a noise variance value generated as a function of maximum likelihood path noise variance.

72. The method according to claim 61, wherein said step of generating a soft output value comprises calculating said soft output value according to the following function $$SO(s_k - A_l) = \frac{(\bar{e}_k - \bar{a}_0)^H (\bar{e}_k - \bar{a}_0) - (\bar{e}_k - \bar{a}_l)^H (\bar{e}_k - \bar{a}_l)}{\sigma^2}$$

wherein SO represents a soft output value, s represents hard decision values, A represents symbol candidates, $\bar{a}$ represents a symbol vector, $\bar{e}$ represents error vectors, $\sigma^2$ represents the noise variance, k is a time index and l is a symbol index.

73. The method according to claim 61, wherein said step of generating a soft output value comprises calculating said soft output value according to the following function $$SO(s_k = A_l) = (\bar{e}_k - \bar{a}_n)^H (\bar{e}_k - \bar{a}_n) - (\bar{e}_k - \bar{a}_l)^H (\bar{e}_k - \bar{a}_l)$$

wherein SO represents a soft output value, s represents hard decision values, A represents symbol candidates, $\bar{a}$ represents a symbol vector, $\bar{e}$ represents error vectors, k is a time index and l is a symbol index.

74. The method according to claim 61, wherein said communications receiver is adapted to receive and decode a global system for mobile communication (GSM) signal.

75. The method according to claim 61, wherein said communications receiver is adapted to receive and decode a GSM EDGE Radio Access Network (GERAN) system signal.

76. The method according to claim 61, further comprising the step of providing a second decoder operative to generate receive binary data in accordance with said soft decision values.

77. The method according to claim 61, wherein said M-ary symbol comprises an 8-PSK symbol.

78. The method according to claim 61, further comprising the step of generating said soft decision value represented as a log likelihood ratio (LLR).

79. An electronic data storage media storing a computer program adapted to program a computer to execute the soft output generator process of claim 61.

80. A method of generating soft decision information for an M-ary symbol, said method comprising the steps of:
   providing a sequence of error vectors $e_k$ generated by an inner decoder as a function of a plurality of input samples generated in accordance with a signal received from a channel coupled thereto, an estimate of said channel and its length, and a sequence of hard symbol decisions also generated by said inner decoder;
   providing a symbol vector table comprising a plurality of symbol vectors generated for all possible symbol values; and
   generating a soft output value for each symbol possibility as a function of said error vector and said plurality of symbol vectors.

81. The method according to claim 80, further comprising the step of generating a noise variance value as a function of said sequence of hard symbol decisions and said received input samples and wherein said soft output value is generated also as a function of said noise variance.

82. The method according to claim 81, wherein said step of generating said noise variance value comprises the steps of:
   calculating the convolution of an ideal training sequence with said channel estimate;
   subtracting the results of said convolution from a received training sequence; and
   setting said noise variance value to tie difference generated thereby.

83. The method according to claim 80, further comprising the step of providing a noise variance value generated by said first decoder.

84. The method according to claim 80, further comprising the step of providing a noise variance value generated as a function of training noise variance.

85. The method according to claim 80, further comprising the step of providing a noise variance value generated as a function of maximum likelihood path noise variance.

86. The method according to claim 80, wherein said step of generating a soft output value comprises calculating said soft output value according to the following function $$SO(s_k - A_l) = \frac{(\overline{e}_k - \overline{a}_0)^H(\overline{e}_k - \overline{a}_0) - (\overline{e}_k - \overline{a}_l)^H(\overline{e}_k - \overline{a}_l)}{\sigma^2}$$

wherein SO represents a soft output value, s represents hard decision values, A represents symbol candidates, $\overline{a}$ represents a symbol vector, $\overline{e}$ represent error vectors, $\sigma^2$ represents the noise variance, k is a time index and l is a symbol index.

87. The method according to claim 80, wherein said step of generating a soft output value comprises calculating said soft output value according to the following function $$SO(s_k=A_l)=(\overline{e}_k-\overline{a}_0)^H(\overline{e}_k-\overline{a}_0)-(\overline{e}_k-\overline{a}_l)^H(\overline{e}_k-\overline{a}_l)$$

wherein SO represents a soft output value, s represents hard decision values, A represents symbol candidates, $\overline{a}$ represents a symbol vector, $\overline{e}$ represents error vectors, k is a time index and l is a symbol index.

88. A computer readable storage medium having a computer program embodied thereon for causing a suitably programmed system to generate soft output values by performing the following steps when such program is executed on said system:
   receiving said sequence of hard symbol decisions from said first decoder;
   receiving a plurality of input samples generated based on said received signal;
   receiving an estimate of said channel and its length; and
   generating a soft decision value for all possible values of said M-ary symbol for each given symbol wherein each soft decision value is calculated as a function of said sequence of hard symbol decisions, said plurality of input samples, said channel estimate, said channel length and said noise variance value.

89. The computer readable storage medium according to claim 88, wherein said computer program is suitably programmed to generate a noise variance value and to generate said soft decision value as a function of said noise variance.

90. A method of generating soft decision information for an M-ary symbol received over a channel in a communications system, said method comprising the steps of:
   first determining a first set of values, each value proportional to the conditional probability that a particular candidate symbol was transmitted given an input sample sequence;
   second determining a second value proportional to the conditional probability that a reference symbol was transmitted given said input sample sequence;
   said first set of values and said second value determined as a function of an estimate of said channel and a number of hard symbol decisions proportional to the length of said channel; and
   generating a soft decision value for one or more possible values of said M-ary symbol for each given symbol as a function of said first set of values, said second value and said channel length.

91. A communications receiver for receiving and decoding an M-ary transmitted signal, comprising:
   a radio frequency (RF) front and circuit for receiving and converting said M-ary transmitted signal to a baseband signal;
   a demodulator adapted to receive said baseband signal and to generate a received signal therefrom in accordance with the M-ary modulation scheme used to generate said transmitted signal;
   a first decoder operative to receive said received signal and to generate a sequence of hard symbol decisions therefrom;
   a soft output generator comprising processing means programmed to:
      first determine a first set of values, each proportional to the conditional probability that a particular candidate symbol was transmitted given an input sample sequence;
      second determine a second value proportional to the conditional probability that a reference symbol was transmitted given said input sample sequence;
      said first set of values and said second value determined as a function of an estimate of said channel and a number of hard symbol decisions proportional to the length of said channel;
      generate soft decision value for one or more possible values of said M-ary symbol for each given symbol as a function of said first set of values, said second value and said channel length; and
   a second decoder adapted to receive said soft decision values and to generate binary received data therefrom.

* * * * *